United States Patent [19]

Muller et al.

[11] Patent Number: 4,659,460
[45] Date of Patent: Apr. 21, 1987

[54] MOBILE FLUID PURIFICATION UNIT

[75] Inventors: Richard S. Muller, Richmond; Richard C. Dickerson, Virginia Beach, both of Va.

[73] Assignee: Ecolochem, Inc., Norfolk, Va.

[21] Appl. No.: 715,581

[22] Filed: Mar. 25, 1985

Related U.S. Application Data

[63] Continuation of Ser. No. 613,766, May 24, 1984, abandoned, which is a continuation of Ser. No. 485,479, Apr. 15, 1983, abandoned, which is a continuation-in-part of Ser. No. 268,382, May 29, 1981, Pat. No. 4,383,920.

[51] Int. Cl.$^4$ .............................................. C02F 9/00
[52] U.S. Cl. ..................................... 210/93; 210/237; 210/241; 210/284
[58] Field of Search .............. 210/662, 663, 669, 670, 210/675, 85, 87, 90, 93, 96.1, 241, 264, 269, 284, 314, 335, 340, 237

[56] References Cited

U.S. PATENT DOCUMENTS

| | | | |
|---|---|---|---|
| 2,938,868 | 5/1960 | Carlson et al. | 210/662 |
| 3,329,272 | 7/1967 | Roach | 210/253 |
| 3,630,365 | 12/1971 | Woodbridge et al. | 210/241 |
| 3,985,648 | 10/1976 | Casolo | 210/669 |
| 4,049,548 | 9/1977 | Dickerson | 210/96.1 |
| 4,155,846 | 5/1979 | Novak et al. | 210/264 |
| 4,219,413 | 8/1980 | Jackson et al. | 210/25 |
| 4,305,826 | 12/1981 | Moses | 210/694 |
| 4,383,920 | 5/1983 | Muller et al. | 210/87 |

FOREIGN PATENT DOCUMENTS

| | | |
|---|---|---|
| 1932205 | 1/1971 | Fed. Rep. of Germany. |
| 1642382 | 4/1972 | Fed. Rep. of Germany. |
| 2630465 | 1/1978 | Fed. Rep. of Germany. |

OTHER PUBLICATIONS

Polymetrics, Inc. Publication, "Solutions to Water Problems the World Over".
Polymetrics, Inc. Publication, "Water Service Division Photograph".
Polymetrics Drawing No. B79, "Mobile Demineralizer Emergency Hook-Up Details".

*Primary Examiner*—Ivars Cintins
*Attorney, Agent, or Firm*—Vorys, Sater, Seymour & Pease

[57] ABSTRACT

A mobile fluid purification unit comprises a plurality of treatment tanks mounted on a skid and interconnected by hoses for series flow, parallel flow or a combination of series and parallel flow for carrying out a variety of treatments of the liquid. A plurality of such mobile units can be mounted on a larger vehicle and connected to one another by one or several hoses to provide greater capacity and variety than is possible in a single mobile unit. A cover which may include a heater can be provided for the unit or units.

13 Claims, 4 Drawing Figures

MOBILE FLUID PURIFICATION UNIT

CROSS-REFERENCE TO RELATED APPLICATION

This application is a continuation of Ser. No. 613,766, filed May 24, 1984, now abandoned, which in turn is a continuation of Ser. No. 485,479, filed Apr. 15, 1983, now abandoned, which in turn is a continuation-in-part of Ser. No. 268,382, filed May 29, 1981, now U.S. Pat. No. 4,383,920, issued May 17, 1983.

BACKGROUND OF THE INVENTION (1) Field of the Invention

The invention is in the field of liquid purification or separation apparatus. More particularly, the invention relates to a mobile liquid purification unit and systems including a plurality of units.

(2) Description of the Prior Art

The prior art includes U.S. Pat. No. 4,049,548 to Dickerson which discloses a mobile demineralizer for water treatment having two successive banks of mixed-bed ion exchange resin cylinders which produce extremely high quality water.

Experience has shown that the mixed-bed ion exchange resin cylinders used in the mobile demineralizer of that earlier patent produce a water quality that may be much higher in quality than many industrial water purification customers require, thus creating an economic and chemical inefficiency. Furthermore, the ion exchange resin cylinders used in that invention cannot be regenerated in situ, but must be disconnected and removed from the mobile demineralizer and transported to a regeneration station.

SUMMARY OF THE INVENTION

The parent patent, U.S. Pat. No. 4,383,920, discloses a mobile liquid purification system with a multiplicity of purification treatment tanks which can be connected in parallel, in series, or in a combination of parallel and series. Each of the treatment tanks can be filled with one or more purification treatment materials selected from among the multiplicity of available purification materials. The system described in that patent includes a vehicle and three or more treatment tanks, and the embodiment illustrated shows six treatment tanks mounted in a trailer. However, in a number of uses, a smaller capacity is required than that provided by the illustrated embodiment. In addition, changes in required capacity arise which can be satisfied by the addition or subtraction of mobile units smaller than the system embodied by the illustrated trailer.

In order to attain greater flexibility than previous purification systems, the mobile purification system according to the present invention comprises a mobile liquid purification unit including three or more purification treatment tanks mounted on a basic carrier or vehicle such as a skid or other movable platform. A plurality of the mobile units can be loaded, without mounting, into a conventional truck trailer for transport. One or more mobile units can be unloaded from the truck trailer and mounted on a truck, trailer, rail car, barge, ship or other vehicle larger than the unit itself. Where plural units are mounted, they can be operatively connected to one another after mounting by hoses or other suitable conduits. Various arrangements of hoses and valves can be provided to vary the flow of fluid through the system in various modes, such as series flow, parallel flow and a combination of series and parallel flow. The mobile units can remain on the larger vehicle during use or can be removed readily from the larger vehicle by forklift, crane or other handling apparatus, thereby freeing the larger vehicle for further transport service. The system has the capability of removing the purification materials from the treatment tanks without removing the tanks from the mobile unit, and it also has the further capability of regenerating the purification materials in situ without removing them from the treatment tanks, if desired. A cover of lightweight insulating material can be placed over the unit or units and a heater can be provided.

The mobile liquid purification unit of the present invention is capable of being precisely tailored to the needs of the particular industrial liquid purification job by virtue of the fact that the unit can be configured in a multitude of operating modes. A preliminary chemical analysis of the raw liquid is performed and, on the basis of that analysis, the mobile unit is configured in such a way as to satisfy the job requirements.

DESCRIPTION OF THE PREFERRED EMBODIMENTS

Figure 1:
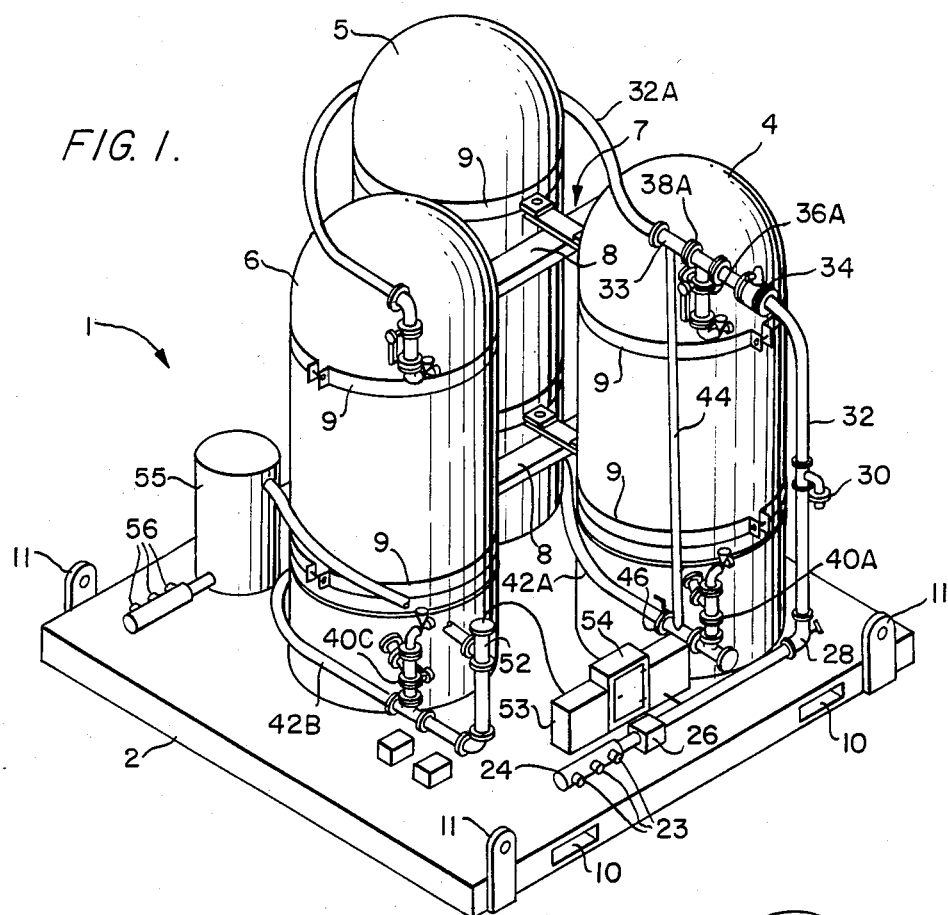
FIG. 1 is a perspective view of a mobile liquid purification unit according to the present invention.

The drawings and the following description illustrate specific working examples of the invention in the field of water purification. As can be seen from FIG. 1, the system comprises a mobile liquid purification unit according to the present invention, generally designated by the reference numeral 1, which includes a skid 2 or other vehicle for carrying three water purification treatment tanks 4, 5 and 6 and associated valves and fluid connections. A support structure, generally designated by the reference numeral 7, is mounted on the skid 2 to maintain the tanks 4-6 fixed in their upright positions. The support structure includes horizontal rails 8 and bands 9, connected to the rails 8, which encircle the tanks 4-6. The skid 2 includes slots 10 for receiving a forklift and lifting lugs 11 for lifting by a crane. Each tank has heads 12 and 14 and an integral circumferential bead 16 on its cylindrical portion just above the lower head 14. The lower head 14 is received in a mating support sleeve or base 18 secured to the skid 2 so that the bead 16 rests on the rim of the sleeve. The tank is joined to the sleeve 18 at the bead by a suitable bonding agent 20.

Although other vehicles for carrying the tanks 4-6 can be used to comprise a mobile fluid purification unit 1, platforms such as the skid 2 are especially effective because of their simplicity and lightweight, their flexibility of application in being used alone or in connection with similar skids, and their ability to be mounted on larger vehicles, such as trailers, to which they can be secured by any suitable means. Three is an especially efficient number of tanks for use in a single mobile liquid purification unit 1 because it is the smallest number which is capable of being operated in series, in parallel, and in a combination of series and parallel. However, it is understood that, where capacity requirements and other application factors dictate, four or more tanks could be mounted on a skid to define a single mobile fluid purification unit.

Figure 2:
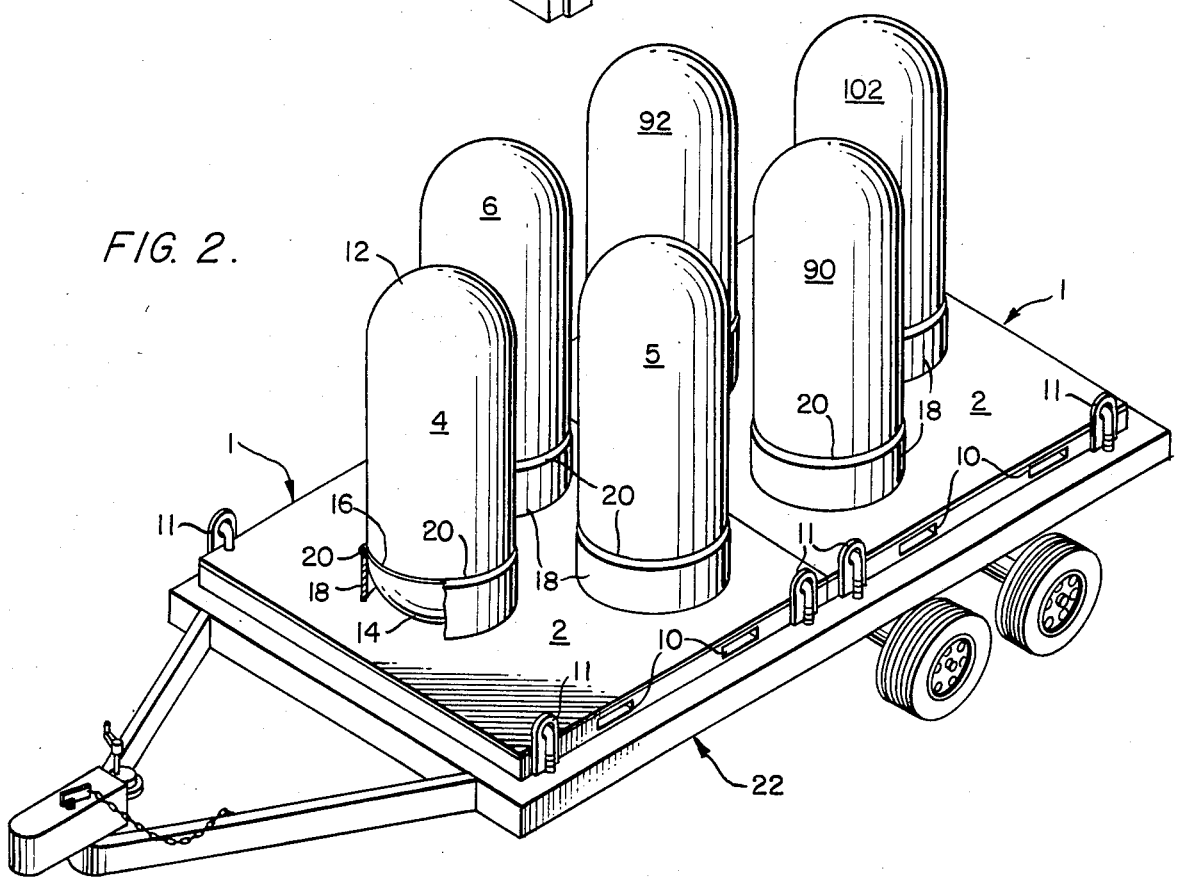
FIG. 2 is a schematic illustration of an arrangement of two mobile liquid purification units on a trailer.

Therefore, a single mobile liquid purification unit 1 has the flexibility for treating relatively large flow rates of liquid in one manner, or treating smaller flow rates of liquid in several respects. For example, one tank could contain commercially-available cation exchange resins which remove cations such as calcium, magnesium, sodium and potassium ions from raw water. A second tank could contain commercially-available anion exchange resins which remove anions such as sulfate, chloride, bicarbonate, and carbonate ions from the water. The third tank could contain a mixedbed ion exchange resin (demineralizer). As an alternative, all three tanks could contain sand to act as sand filters for the removal of suspended material. Many other treatment modes can be carried out within a single mobile fluid purification unit 1, as will be seen from a table to be described hereinafter. Furthermore, additional mobile liquid purification units 1 can be mounted on a larger vehicle, such as the trailer 22 of FIG. 2, adjacent the first mobile unit 1 and placed in fluid communication with the first mobile unit by making a minimal number of connections using flexible conduits. The use of multiple mobile units in this manner provides even greater flexibility in the number of treatments which can be carried out in the process and the flow capacity of each treatment.

Raw water is received from the customer's source via one or more water inlet connections 23. Hose nipples are attached to the outside body of an inlet strainer 24. The purpose of this strainer is to prevent foreign bodies from entering the unit. After leaving the strainer, the flow is measured in an indicating and recording flow meter 26. If the raw water source is under high pressure, a pressure reducing valve 28 can be included downstream from the flow meter 26. This valve reduces the incoming pressure to that suitable for the system, and prevents overloads in the system from occurring. A rupture disc 30 can also be mounted in this inlet piping to protect the system from pressure overload.

The water is then carried by a conduit, such as a rubber hose 32, to permit flexing when the mobile unit 1 is subject to impacts and vibration during handling and travelling. Before reaching the first tank 4, any entrapped air in the hose is released through an air release valve 34. This valve serves a dual purpose in that it admits air during the draining of the system to prevent a vacuum from being imposed in the system and it removes air from the system during start up and normal operation.

Figure 3:
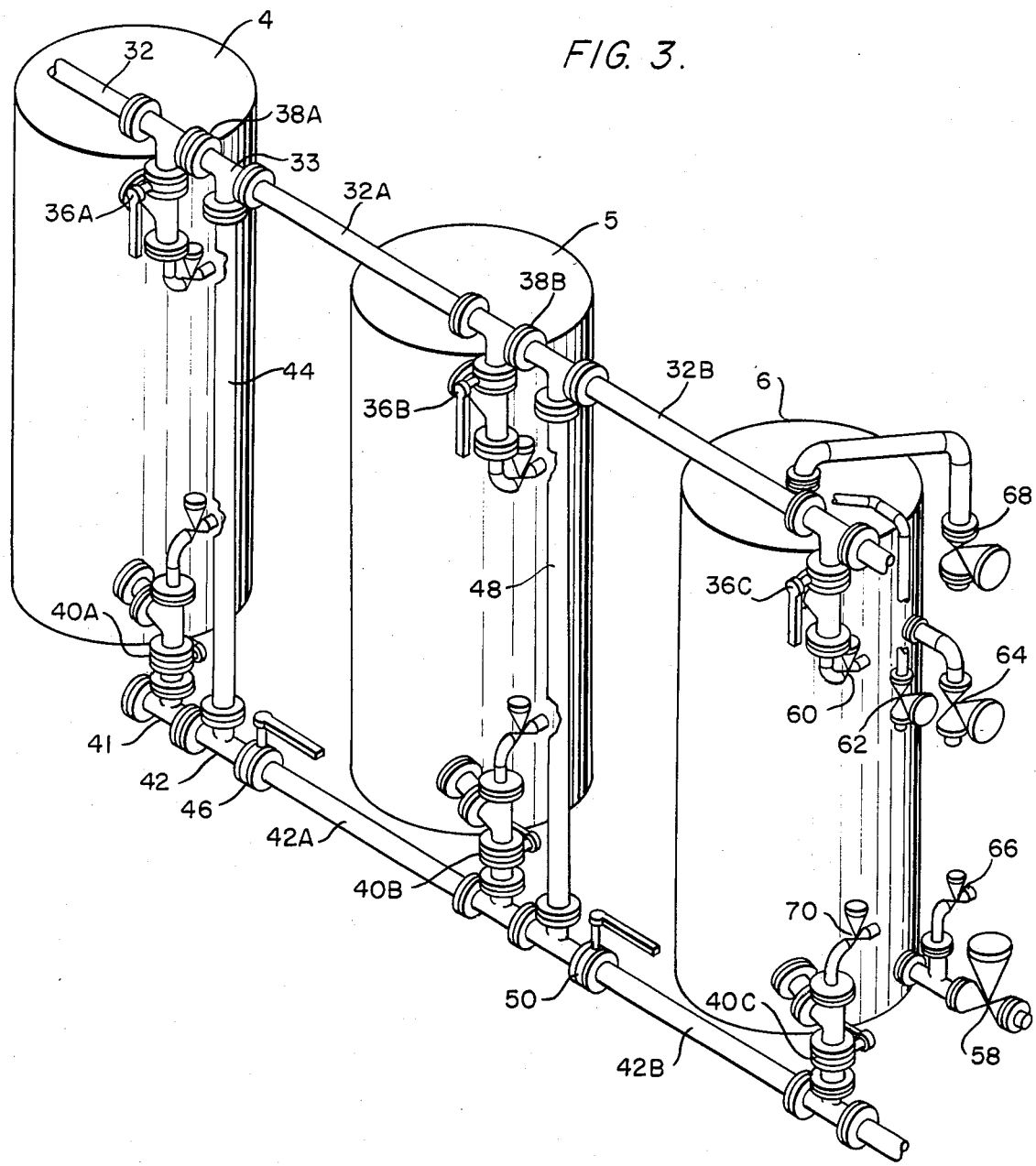
FIG. 3 is a schematic illustration of piping for one of the mobile liquid purification units of FIG. 2.

As can best be seen from the schematic illustration of FIG. 3, the raw water delivered by the hose 32 enters at the top of the tank 4 through a water inlet valve 36A. Incoming water is prevented from continuing to a tee 33 and an upper hose 32A by a blind flange 38A. The tank 4 contains, in this example, commercially-available cation exchange resins which remove cations such as calcium, magnesium, sodium, and potassium ions from the raw water. The water passes down through the cation resin in the tank 4 and goes through a water outlet valve 40A into tees 41 and 42. The water is diverted up through a crossover hose 44, which is connected between the tee 42 and the tee 33 at a point downstream of the blind flange 38A, since a valve 46, which is mounted in between the tee 42 and a connecting hose 42A, is closed. The connecting hose 42A connects the valve 46 to a tee downstream of an outlet valve 40B associated with the outlet of the tank 5 to permit the connection of the tank 4 in parallel with the tank 5, when desired.

The tank 5 operates in series with the tank 4 by the connection of the upper hose 32A to the water inlet valve 36B at the top of the tank 5. The tank 5 contains, in this example, commercially-available anion exchange resins which remove anions such as sulfate, chloride, bicarbonate, and carbonate ions from the water. The incoming water is prevented from continuing to a top hose section 32B by a blind flange 38B. Water passes down through the anion exchange resin in the tank 5 and exits through the outlet valve 40B. The outlet valve 40B of the tank 5 is connected to the lower connecting hose 42B. The water is then diverted vertically through a crossover hose 48 by having closed valve 50 positioned in a lower connecting hose 42B just downstream of the inlet to the crossover hose 48. This diverts the flow into the tank 6, which in this example contains a mixed-bed ion exchange resin, the flow entering at the top of tank 6 through an inlet valve 36C, passing down through the bed inside the tank 6, and leaving through an outlet valve 40C as in the previous tanks.

At this point, the entire flow from the system is measured for its quality by a conductivity cell 52 (FIG. 1). The output from the conductivity cell 52 is measured and recorded on a conductivity monitor 53. This monitor has adjustable set points, and should the quality of the water being delivered be below the set point, then the conductivity monitor 53 provides an electrical signal to the pressure reducing valve 28, which will cause it to close. At the same time, the system can be arranged to sound an alarm to alert the operator that the water quality is below the set point, and has been shut off. To protect the system from high ambient temperatures, a temperature measuring and alarm system 54 will sound an alarm and can be connected (if desired) to close the pressure reducing valve 28. Following this, the flow passes through a resin trap and strainer filter 55. The purpose of the resin trap 55 is to catch any resin which might leave the system and to prevent it from getting into the water system to which outlets 56 of the mobile water purification unit 1 are connected. Although some detail is shown in FIG. 3, the figure is intended to be schematic in nature to show the arrangement of valves and hoses. The tanks 4-6 are not necessarily in a straight line arrangement like the ones shown in FIG. 3, this fact being clear from the arrangement shown in FIGS. 1 and 2.

The configuration described in the foregoing example represents the use of the system when tanks 4, 5 and 6 are connected in series. One of the features of this system is complete flexibility of use. For example, it may be desirable to have tanks 4 and 5 in parallel, and their combined effluent going to tank 6. In such a configuration, the crossover hose 44, and the blind flange 38A would be removed from between tanks 4 and 5 and valve 46 opened. This would put tanks 4 and 5 in parallel operation, with their total flow going into tank 6.

It is also possible, by other changes in piping, to utilize one or more of the tanks as sand filters for the removal of suspended material, to use them as activated carbon filters ahead of a demineralizer system, or for uses other than demineralization. For example, the equipment could be used with all three tanks in parallel (i.e., with no crossover hoses) as a three tank sodium zeolite softener. This system, by virtue of its flexibility, could also be used for other special applications whereby ion exchange resins are used for the removal of ions from a solution.

In certain cases, where the flow path of the liquid through the tanks may remain unchanged, to merely provide a single inlet valve adjacent to the inlet connections 23 and a single outlet valve adjacent to the outlet connections 56, and eliminate all of the valves associated with the individual tanks.

The following table illustrates some of the modes in which the unit 1 may be configured and operated:

| TANK NO. | | | MODE |
|---|---|---|---|
| 4 | 5 | 6 | OF OPERATION |
| Treatment Material: | | | |
| (a) sand | sand | sand | all tanks in parallel |
| (b) activated carbon | activated carbon | activated carbon | all tanks in parallel |
| (c) cation | cation | cation | all tanks in parallel |
| (d) cation/anion | cation/anion | cation/anion | all tanks in parallel |
| (e) scavenging resin | scavenging resin | scavenging resin | all tanks in parallel |
| (f) cation | cation | anion | parallel/series: tanks 4 and 5 in parallel; tank 6 in series |
| (g) cation | anion | anion | parallel/series: tank 4 in series; tanks 5 and 6 in parallel |
| (h) cation | weak base anion | strong base anion | all tanks in series |

Equipment may be provided by which the tanks may be regenerated by removing the resins from the unit, in which case connections are made to a resin outlet valve 58 at the bottom of each tank, one of which is shown on tank 6 in FIG. 3. Sluicing water may be added to the tank via a regeneration inlet valve 60, a vent valve 62, or a spray valve 64, depending upon the particular desired result. Should additional sluicing water be required, or should a stoppage in the resin outlet be encountered, additional water may be injected via a valve 66. This same valve will also provide additional sluicing water in the resin out line, if necessary. The spray valve 64 is connected internally with a spray water system which is used in removing the resin from the tanks. Regenerated resin is replaced in each tank through a resin inlet valve 68 located at the top of each tank. For simplicity, not all of the valves have been shown in the drawing. For example, valves 58, 60, 62, 64, 66 and 68 are identical on each tank. Furthermore, such valves may be used in connection with the tanks of FIG. 1, but have been omitted from FIG. 1 for clarity of illustration of the other features of the invention.

The foregoing regeneration refers to an operation in which the ion exchange resins are removed from the tanks and regenerated. Should it be necessary or desirable to regenerate the resins in the tanks, the necessary regenerants are injected through the regeneration inlet valve 60 in each tank, and removed from each tank through a regeneration outlet valve 70. These valves, when connected to the proper sources, and when opened, will allow regeneration chemicals to be injected into and then removed from the tanks. During this regeneration operation, the water inlet valves 36 A-C and the water outlet valves 40 A-C must be closed to isolate each tank from the rest of the mobile unit. The vent valve 62 is provided in each tank to relieve air which may be in the tanks when they are filled, and to add air when draining. It is also a way of adding additional water to the tanks. By virtue of the design of the mobile unit, the tanks can be backwashed in place prior to regeneration. In this case, backwash water would be admitted through the valve 70 and removed through the regeneration inlet valve 60 or through the resin inlet valve 65.

Figure 4:
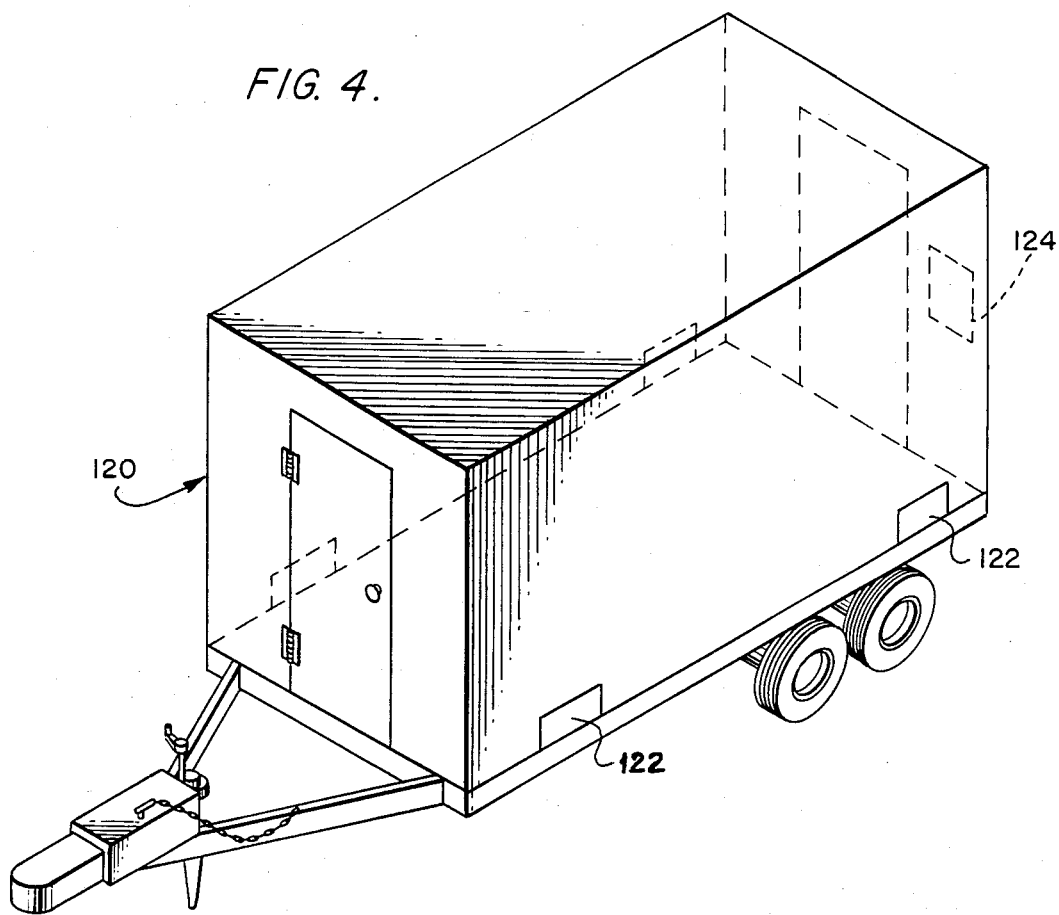
FIG. 4 is a perspective view of a cover for the arrangement of FIG. 2.

For many applications, the mobile units 1 can be exposed to the elements. However, where the units would be subjected to cold, that is, temperatures below 35° F, protection should be provided since ion exchange resins are susceptible to rapid deterioration at low temperatures. In such cases, the mobile unit 1, or a plurality of mobile units 1, are provided with a cover such as a doghouse cover, as is designated by the reference numeral 120 in FIG. 4. In addition, access doors 122 can be provided in appropriate places in the walls of the cover 120 to provide access to hose connections. Furthermore, a heater 124 is provided to maintain the temperature inside the cover above 35° F. under the most extreme outside temperature conditions. Any suitable heater, such as an electric heater or a gas heater, may be used. A high temperature alarm and a low temperature alarm may be provided.

The important features of the inventive system are that it is very flexible in its use, it has a variety of applications through not only piping flexibility, but also because of the number of tanks and the various combinations of resin which they can contain. Not only is this system suitable as mentioned above for use with resins, but for any other water treatment processes which require a pressure vessel and the passing of the water through a fixed bed of material, whether that material be sand, activated carbon, ion exchange resin, or a special catalyst that is used in some highly specific industry.

In this system, all of the tanks are interconnected using hose. The reason for this is to prevent possible difficulties with the piping system if it were to be connected with rigid pipe. The trailer 22 may deform slightly and the relative positions of adjacent skids may shift. Hose is used so that each tank is individual and can move independently of the others without damage to itself or to the other tanks. Further, by use of flanged piping, the piping can be rearranged to allow the use of the tanks in series, in parallel, or in a combination of series and parallel.

The above-described embodiments are intended to be illustrative, not restrictive. The full scope of the invention is defined by the claims, and any and all equivalents are intended to be embraced.

What is claimed is:

1. A mobile liquid purification unit comprising:
   (1) a skid forming a movable platform;
   (2) a set of three or more liquid purification treatment tanks each having a lower substantially rounded head including a circumferential bead adjacent one end thereof at a location above said lower head and mounted on said skid by a sleeve for each tank mounted on the skid, the bead of each tank engaging an upper rim surface at respective sleeve to rest thereon and joined thereto by a bonding agent for stably securing each of said tanks to said sleeve, each of said treatment tanks containing a liquid purification treatment material, each of said treatment tanks further having a liquid inlet, a liquid outlet, a purification treatment material inlet, and a purification treatment material outlet;

(3) a unit inlet means adapted to be connected to a source of raw liquid to be purified;

(4) a unit outlet means for delivering purified liquid;

(5) liquid conduit means and valve means for conveying said raw liquid from said unit inlet means to said treatment tanks and between said treatment tanks and from said treatment tanks to said unit outlet means, said conduit means and said valve means being selectively connected to said treatment tanks whereby said treatment tanks are capable of being operated (a) in series, (b) in parallel, and (c) in a combination of series and parallel;

(6) measuring means for monitoring the quality of the purified liquid outlet; and (7) said skid being structurally adapted for novement with said tanks secured thereon to said source of raw liquid.

2. The unit of claim 1 wherein the conduit means comprise flexible conduits.

3. The unit of claim 2 wherein the flexible conduits are hoses.

4. The unit of claim 1 wherein slots are defined in the edges of the skid to accommodate a fork lift.

5. The unit of claim 1 wherein brace means are provided on the skid for securing the tanks in an upright position.

6. The unit of claim 5 wherein the brace means comprises a rail mounted on the skid, and bands encircling the tanks and connected to the rail.

7. The unit of claim 1 further comprising a cover for said unit, the cover being mounted on the skid.

8. The unit of claim 1 wherein each of said treatment tanks further includes a regeneration liquid inlet and a regeneration liquid outlet, whereby the purification treatment material in each of said treatment tanks is capable of being regenerated in situ.

9. A mobile liquid purification unit for treating a liquid at a site of the type which includes a plurality of purification treatment tanks which are structurally adapted and physically related to be connected in parallel, in series, or a combination of parallel and series, each tank including one or more purification treatment materials, said tanks having a substantially rounded lower end and being transportable on said unit between respective liquid purification sites, said unit comprising:

a movable platform, said platform receiving thereon said plurality of purification treatment tanks in an upright position, said movable platform being structurally sized and adapted for mounting and transportation between remote liquid purification sites on another vehicle while said purification tanks are secured to said movable platform;

means for securing said tanks to said movable platform in a stable relationship while said platform is moved, said securing means including a support structure interconnecting said treatment tanks and said platform, said securing means including a sleeve engaging at one end a bead on said tank at a portion remote from its lower portion and engaging at another end said platform, so that the bead on said tank is stably supported on a rim of said sleeve in an upright position; and lifting means on said movable platform for receiving a lifting member of a remote lifting device so that said movable platform may be moved from one location at a liquid purification site to another by said remote lifting device.

10. The unit as set forth in claim 9 where said securing neans includes a structural member secured to said platform and bands for securely connecting said tanks to said structural member.

11. The device as claimed in claim 9 further including a cover mounted on said platform for enclosing said tanks.

12. In a combination of the type which includes a plurality of water treatment tanks securely mounted on a skid in an upright position and structurally adapted to interconnect with associated valves and conduits to provide fluid connection among said tanks to treat water, the improvement comprising:

said skid having a generally horizontal surface onto which said tanks are mounted and at least a pair of opposed end surfaces, at least one of said opposed end surfaces defining at least a pair of slots for receiving tynes of a forklift so that said skid with said tank is secured thereto may be transported by a forklift to a work station;

said skid further including a plurality of lifting legs structurally adapted for receiving the hook of a crane; and the skid being sized and structurally adapted to be received on a vehicle for transporting one or more of said skids from a point to a remote point to treat water on site;

said tanks each including a rounded bottom where a sleeve having a diameter slightly larger than the diameter of said tank and having an axial length receives the bottom of said tank thereon, the other end of said sleeve resting on said skid, said tank having a bead thereon engaging a rim of said sleeve, said tank being secured by bonding to said sleeve at the end of said sleeve opposite said other end.

13. A mobile liquid purification unit for treating a liquid at a site of the type which includes at least one purification treatment tank which is structurally adapted and physically related for connection to a source of liquid to be treated, said tank including one or more purification treatment materials, said tank having a substantially rounded bottom end and being transportable on said unit between respective liquid purification sites, said unit comprising:

a movable platform, said platform receiving thereon said purification treatment tank in an upright position, said movable platform being structurally sized and adapted for mounting and transportation between remote liquid purification sites on another vehicle while said purification tanks are secured to said movable platform; and means for securing said tanks to said movable platform in a stable relationship while said platform is moved, said securing means including a support structure interconnecting said treatment tanks and said platform, said securing means including a sleeve engaging at one end a bead on said tank at a port on remote from its lower portion and engaging at another end said platform, so that the bead on said tank is stably supported on a rim of said sleeve in an upright position.

* * * * *